2,695,896

INTERPOLYMERIZATION PRODUCTS OF AROMATIC VINYL COMPOUNDS, GLYCERIDE OILS, AND OIL-ALKYDS

Heinz Ehring, Krefeld, and Karl Raichle, Krefeld-Uerdingen, Germany, assignors to Farbenfabriken Bayer Aktiengesellschaft, Leverkusen, Germany, a corporation of Germany No Drawing. Application February 13, 1951, Serial No. 210,801

Claims priority, application Germany February 16, 1950

15 Claims. (Cl. 260—22)

This invention relates to interpolymerisation products of aromatic mono-vinyl hydrocarbons and a process for making the same.

It is known that mixtures of aromatic mono-vinyl hydrocarbons and alkyd resins which contain the radicals of higher fatty acids having conjugated double bonds such as, for example, the radicals of ricinenic acid, of the wood oil fatty acids or of the oiticica fatty acids, have a tendency to gelatinize during interpolymerisation.

According to the present invention, the tendency to gelatinize is greatly reduced, or completely obviated, by incorporating with the above-mentioned mixtures animal or vegetable oils which contain the radicals of unsaturated higher fatty acids.

Among the aromatic mono-vinyl hydrocarbons suitable as constituents of the interpolymerisation mixtures there may be named, for example, styrene, alpha-methylstyrene, styrenes halogenated in the nucleus, and vinylnaphthalene.

The alkyd resins which contain the residues of higher fatty acids, e. g. ricinenic acid, wood oil or oiticica fatty acids, having conjugated double bonds, may have various radicals characteristic of alkyd resins, e. g. the radicals of polyvalent alcohols such as glycol, glycerol, pentaerythritol, trimethylolethane, trimethylolpropane, mannitol, sorbitol and hexanetriol, the radicals of polybasic carboxylic acids, such as phthalic acid, succinic acid, adipic acid and maleic acid, and the radicals of monobasic higher fatty acids such as, for example, palmitic acid, oleic acid, and linoleic acid.

Among the animal or vegetable oils containing the radicals of unsaturated higher fatty acids, used in the mixtures according to the invention, there may be mentioned non-drying oils such as olive oil, groundnut oil, palm oil, and rape oil; semi-drying oils such as cottonseed oil, poppyseed oil, soya-bean oil, sardine oil, cod-liver oil, menhaden oil and pilchard oil; and drying oils such as linseed oil, perilla oil, tung oil, and oiticica oil.

The interpolymerisation is effected in a known manner by the application of heat preferably at temperatures of about 130° C. to about 200° C.

Preferably, interpolymerisation is carried out in the presence of a neutral solvent. Suitable solvents are, for example, carbon tetrachloride, benzine, oil of turpentine, chlorobenzene, toluene, xylene, ethyl benzene, and mixtures of any of the said aromatic hydrocarbons with benzine.

Interpolymerisation can be promoted by the addition of catalysts such as peroxide compounds, for example benzoyl peroxide.

By the addition to the polymerisation mixture of cellulose derivatives such as cellulose nitrate and ethyl cellulose; polyvinyl compounds such as polyvinyl chloride and polyvinylacetate; and/or natural or artificial resins such as rosin, copals, resinic esters, oil modified phenol-formaldehyde resins, ketone-formaldehyde condensation products; the properties of the interpolymerisation products can be adapted to the desired purpose of use.

The following examples are given to illustrate the invention, the parts mentioned being by weight:

*Example 1*

A mixture of 870 parts of styrene, 265 parts of linseed oil, 1200 parts of solvent naphtha, 200 parts of cyclohexanone and 400 parts of an alkyd resin containing the radical of ricinenic acid prepared in known manner from 3200 parts of castor oil, 920 parts of trimethylolpropane and 1150 parts of phthalic anhydride at 260° C., said alkyd resin having an acid value of 15 and having, as a 50 per cent solution in white spirit, a viscosity of 195 sec. in a Ford cup No. 4 at 20° C., was heated at 140° C. under reflux for 50 hours. The styrene conversion amounted to 95.5 per cent. The product obtained in this manner had a viscosity of 145 sec., determined in a Ford cup No. 4 at 20° C. Varnishes prepared therefrom dried in air within 15 minutes and are remarkable by reason of their considerable hardness, high gloss, good water resistance, as well as resistance to acids and alkalies.

In the absence of linseed oil, the above described mixture gelatinizes even after 18 hours, the styrene conversion amounting to only 62 per cent.

*Example 2*

A mixture of 73 parts of olive oil, 290 parts of styrene, 470 parts of ethylbenzene and 148 parts of an alkyd resin prepared in known manner from 2975 parts of castor oil, 630 parts of glycerol and 1160 parts of phthalic anhydride at 260° C., said alkyd resin having an acid value of 12 and having as a 50 per cent solution in white spirit a viscosity of 195–260 sec., determined in a Ford cup No. 4 at 20° C., was heated at 140° C. under reflux for 33 hours. The styrene conversion then amounted to about 80 per cent. The solution had a viscosity of 220 sec., determined in a Ford cup No. 4 at 20° C., and after driers had been added, was dried in air within 15 minutes to a non-tacky film. The coatings produced therewith are highly elastic and particularly fast to light.

In the absence of olive oil, the above described polymerisation mixture gelatinizes even after 18 hours, the styrene conversion amounting to only 60 per cent.

*Example 3*

A mixture of 220 parts of sardine oil having an iodine number of 180, 800 parts of styrene, 70 parts of alpha-methylstyrene, 1400 parts of xylene, and 445 parts of the alkyd resin used in Example 2, was heated at 145° C. under reflux for about 55 hours. The styrene conversion amounted to 95 per cent. The solution obtained in this manner had a viscosity of about 145 sec., determined in a Ford cup No. 4 at 20° C. and, after the addition of driers, dried in air to a non-tacky and hard film.

*Example 4*

When using in Example 2 an equal quantity of rape oil instead of linseed oil, the styrene conversion after heating at 145° C. under reflux for 40 hours amounted to about 85 per cent. The solution thus obtained had a viscosity of about 130 sec., determined in a Ford cup No. 4 at 20° C. Coatings produced by means of the said solution dried very rapidly, both in air and in an oven at 70° C., to form highly elastic and light-resistant films of high gloss.

*Example 5*

A mixture of 70 parts of tung oil, 356 parts of styrene, 575 parts of xylene, and 202 parts of the alkyd resin used in Example 2, was heated at 143° C. under reflux for 45 hours. The styrene conversion then amounted to about 80 per cent. The solution thus obtained had a viscosity of 195 sec., determined in a Ford cup No. 4 at 20° C., and after the addition of driers yielded clear films which dried very quickly and without frosting.

*Example 6*

A mixture of 125 parts of linseed oil, 250 parts of styrene, 490 parts of xylene, 80 parts of cyclohexanone, and 250 parts of an alkyd resin prepared at 260° C. in known manner from 1800 parts of linseed oil, 620 parts of tung oil, 800 parts of glycerol and 1475 parts of phthalic anhydride, the said alkyd resin having an acid value of 20 and having, as a 50 per cent solution in toluene, a viscosity of 55 sec., determined in a Ford cup No. 4 at 20° C. was heated at 140° C. under reflux for 100 hours. The styrene conversion then amounted to about 80 per cent. The solution thus obtained had a viscosity of 65 sec., determined in a Ford cup No. 4 at 20° C., and after the addition of driers dried, both in air and in an oven, in 15 minutes without frosting. The coatings had high gloss, were water-resistant and resistant to impact.

Without the addition of linseed oil to the mixture, the above described polymerisation mixture gelatinized already after 30 hours.

*Example 7*

A mixture of 90 parts of tung oil, 355 parts of styrene, 573 parts of solvent naphtha, and 182 parts of the alkyd resin used in Example 6, was heated at 145° C. under reflux for 80 hours. The styrene conversion then amounted to about 85 per cent. The solution obtained had a viscosity of 110 sec., determined in a Ford cup No. 4 at 20° C., and after the addition of driers dried in air within 10 minutes, without frosting, to form films having a high gloss.

We claim:

1. The process which comprises interpolymerizing a monomeric aromatic mono-vinyl hydrocarbon with a mixture of an alkyd resin, modified by an unpolymerized glyceride oil having conjugated double bonds, and an unpolymerized, unsaturated glyceride oil selected from the group consisting of animal oil and vegetable oil.
2. The process of claim 1 wherein the interpolymerization is effected in the presence of a solvent.
3. The process of claim 1 wherein the monomeric aromatic mono-vinyl hydrocarbon is styrene.
4. The process of claim 1 wherein the monomeric aromatic mono-vinyl hydrocarbon is styrene and wherein the interpolymerization is effected in the presence of a solvent.
5. The process which comprises interpolymerizing styrene with a mixture of an alkyd resin, modified by the acid radical of unpolymerized ricinenic acid, and an unpolymerized unsaturated glyceride oil selected from the group consisting of animal and vegetable oil.
6. The process of claim 5 wherein the interpolymerization is effected in the presence of a solvent.
7. The process which comprises interpolymerizing styrene with a mixture of an alkyd resin, modified by the acid radical of unpolymerized ricinenic acid, and unpolymerized linseed oil, in the presence of a solvent.
8. The process which comprises interpolymerizing styrene with a mixture of an alkyd resin, modified by the acid radicals of unpolymerized tung oil and linseed oil acids, and unpolymerized linseed oil, in the presence of a mixture of xylene and cyclohexanone as a solvent.
9. The process which comprises interpolymerizing styrene with a mixture of an alkyd resin, modified by the acid radicals of unpolymerized tung oil and linseed oil acids, and unpolymerized wood oil, in the presence of naphtha as a solvent.
10. The product formed by the process of claim 1.
11. The product formed by the process of claim 3.
12. The product formed by the process of claim 5.
13. The product formed by the process of claim 7.
14. The product formed by the process of claim 8.
15. The product formed by the process of claim 9.

References Cited in the file of this patent

UNITED STATES PATENTS

| Number | Name | Date |
|---|---|---|
| 2,586,092 | Robinson | Feb. 19, 1952 |

FOREIGN PATENTS

| Number | Country | Date |
|---|---|---|
| 580,912 | Great Britain | Sept. 24, 1946 |
| 609,750 | Great Britain | Oct. 6, 1948 |

OTHER REFERENCES

Hewitt et al., J. Oil and Colour Chemists Ass'n, June 1946, pp. 111–118.